United States Patent
Mao et al.

(10) Patent No.: US 10,014,761 B2
(45) Date of Patent: Jul. 3, 2018

(54) CONTROL METHOD AND DEVICE FOR I-TYPE THREE-LEVEL CIRCUIT

(71) Applicant: Emerson Network Power Co., Ltd, Shenzhen, Guangdong (CN)

(72) Inventors: Yunhe Mao, Guangdong (CN); Zhixian Wu, Guangdong (CN); Jian Li, Guangdong (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 0 days.

(21) Appl. No.: 15/364,961

(22) Filed: Nov. 30, 2016

(65) Prior Publication Data
US 2017/0155313 A1     Jun. 1, 2017

(30) Foreign Application Priority Data
Dec. 1, 2015    (CN) .......................... 2015 1 0866384

(51) Int. Cl.
*H02M 7/217*     (2006.01)
*H02M 1/08*      (2006.01)
(Continued)

(52) U.S. Cl.
CPC ......... *H02M 1/081* (2013.01); *H02M 1/4208* (2013.01); *H02M 7/487* (2013.01);
(Continued)

(58) Field of Classification Search
CPC ...... H02M 5/40; H02M 5/453; H02M 7/7575; H02M 5/458; H02M 5/45; H02M 1/4208;
(Continued)

(56) References Cited

U.S. PATENT DOCUMENTS

| 8,363,434 B2 * | 1/2013 | Lin | ...................... H02M 1/4208 |
|---|---|---|---|
| | | | 363/127 |
| 2012/0127765 A1 * | 5/2012 | Maruyama | .............. H02J 5/005 |
| | | | 363/126 |

FOREIGN PATENT DOCUMENTS

EP          2675055 A1    12/2013

OTHER PUBLICATIONS

European Search Report regarding Application No. EP16201398 dated Mar. 23, 2017, European Patent Office, Munich, Germany.
(Continued)

*Primary Examiner* — Nguyen Tran
(74) *Attorney, Agent, or Firm* — Harness, Dickey & Pierce, P.L.C.

(57) ABSTRACT

Control method and device for I-type three-level circuit are disclosed, which can realize zero-voltage turn on of switching tube of high-frequency bridge arm, reduce circuit loss and improve circuit efficiency. The control method includes: detecting a current of an inductor connected with each of high-frequency arm bridges in operation state in the circuit; in a positive half cycle of AC connection terminal voltage of the circuit, when a freewheeling switching tube of the high-frequency arm bridge connected with the inductor is in ON state and a main switching tube is in OFF state, controlling the freewheeling switching tube to keep in ON state and the main switching tube to keep in OFF state if the current does not reach a preset negative current, and controlling the freewheeling switching tube to be turned off and the main switching tube to be turned on if the current reaches the preset negative current.

8 Claims, 22 Drawing Sheets

(51) Int. Cl.
  *H02M 1/42* (2007.01)
  *H02M 1/00* (2006.01)
  *H02M 7/487* (2007.01)

(52) U.S. Cl.
  CPC .............. *H02M 2001/0009* (2013.01); *H02M 2001/0048* (2013.01); *H02M 2001/0058* (2013.01)

(58) Field of Classification Search
  CPC .. H02M 1/4233; H02M 5/4585; H02M 7/217; H02M 7/219; H02M 1/081; H02M 1/084; H02M 7/155; H02M 7/1557; H02M 1/4225; H02M 7/00; H02M 7/04; H02H 7/261; H02H 7/268; H02J 3/36; G05F 1/455; G05F 1/38
  USPC ...... 363/34–37, 44, 48, 52, 53, 78, 125, 127
  See application file for complete search history.

(56) References Cited

OTHER PUBLICATIONS

Leuenberger et al., "Comparison of a Soft Switched TCM T-Type Inverter to Hard Switched Inverters for a 3 Phase PV Grid Interface," Swiss Federal Institute of Technology Zurich, 2012, pp. 1-8.
Marxgut et al., "Interleaved Triangular Current Mode (TCM) Resonant Transition, Single Phase PFC Rectifier with High Efficiency and High Power Density," Swiss Federal Institute of Technology Zurich, 2010, pp. 1725-1732.

* cited by examiner

CONTROL METHOD AND DEVICE FOR I-TYPE THREE-LEVEL CIRCUIT

CROSS REFERENCE TO RELATED APPLICATIONS

The application is related to Chinese Patent Application No. 201510866384.X filed on Dec. 1, 2015 and entitled "CONTROL METHOD AND DEVICE FOR I-TYPE THREE-LEVEL CIRCUIT", the content of which is incorporated herein by reference.

FIELD

The present disclosure relates to the field of power electronics technology, and particular to a control method and a device for an I-type three-level circuit.

BACKGROUND

Currently, various I-type level circuits have been widely applied into multiple fields due to an advantage of high efficiency. FIG. 1 shows a common I-type three-level circuit, including: switching tubes S1, S2, S3 and S4; clamp diodes Dc1 and Dc2; an inductor L; bus capacitors Co+ and Co−; diodes D1, D2, D3 and D4 are external anti-paralleled diodes or body diodes of the switching tubes S1, S2, S3 and S4, respectively; capacitors Coss1, Coss2, Coss3 and Coss4 are equivalent junction capacitors of the switching tubes S1, S2, S3 and S4, respectively; and capacitors Cdc1 and Cdc2 are equivalent junction capacitors of the clamp diodes Dc1 and Dc2, respectively, wherein:

the switching tubes S1, S2, S3 and S4 are connected in sequence to construct a high-frequency bridge arm, the bus capacitors Co+ and Co− are connected in series, and then connected in parallel between two terminals of the high-frequency bridge arm, the two terminals of the high-frequency bridge arm are direct-current (DC) connection terminals of the I-type three-level circuit. A middle point of the high-frequency arm bridge is a terminal, connected to the inductor L, of a connection node of the switching tubes S2 and S3, the other terminal of the inductor L is an alternating-current (AC) connection terminal of the I-type three-level circuit. A connection node of the switching tubes S1 and S2 is connected to a connection node of the switching tubes S3 and S4 via the clamp diodes Dc1 and Dc2 connected in series. A connection node of the clamp diodes Dc1 and Dc2 and a connection node of the bus capacitors Co+ and Co− are connected together, and then are earthed.

Specifically, the switching tubes S1, S2, S3 and S4 may be a Metal Oxide Semiconductor Field Effect Transistor (MOSFET), as shown in FIG. 2. The switching tubes S1, S2, S3 and S4 may be a controllable switching tube such as an Insulated Gate Bipolar Transistor (IGBT), which is not illustrated here.

FIG. 1 shows an I-type three-level circuit. In a positive half cycle of an AC connection terminal voltage $U_N$, the switching tube S1 is a freewheeling switching tube, the switching tube S2 is in ON state, the switching tube S3 is a main switching tube, the switching tube S4 is in OFF state. In a negative half cycle of the AC connection terminal voltage $U_N$, the switching tube S1 is in OFF state, the switching tube S2 is a main switching tube, the switching tube S3 is in ON state, and the switching tube S4 is a freewheeling switching tube.

In conventional technology, a common control method for the I-type three-level circuit is a control of inductor current continuous conduction mode such as Critical Conduction Mode (CRM) control. However, such control method can not realize zero-voltage turn on of the switching tube of the high-frequency arm bridge, which results in great circuit loss.

SUMMARY

A control method and device for an I-type three-level circuit is provided according to the embodiments of the present disclosure, to solve the problem in the conventional technology that zero-voltage turn on of the switching tube of the high-frequency arm bridge cannot be realized.

A control method for an I-type three-level circuit according to an embodiment of the present disclosure includes:

detecting a current of an inductor connected with each of high-frequency arm bridges in an operation state in the I-type three-level circuit;

in a positive half cycle of an AC connection terminal voltage of the I-type three-level circuit, when a freewheeling switching tube of the high-frequency arm bridge connected with the inductor is in ON state and a main switching tube of the high-frequency arm bridge connected with the inductor is in OFF state, controlling the freewheeling switching tube in ON state to keep in ON state and the main switching tube in OFF state to keep in OFF state if it is detected that the current of the inductor does not reach a preset negative current, and controlling the freewheeling switching tube in ON state to be turned off and the main switching tube in OFF state to be turned on if it is detected that the current of the inductor reaches the preset negative current.

Optionally, prior to controlling the freewheeling switching tube in ON state to keep in ON state and the main switching tube in OFF state to keep in OFF state, the method further includes:

determining that an instantaneous value of the AC connection terminal voltage of the I-type three-level circuit is greater than or equal to a half of a DC connection terminal voltage.

A control method for an I-type three-level circuit according to an embodiment of the present disclosure includes:

detecting a current of an inductor connected with each of high-frequency arm bridges in an operation state in the I-type three-level circuit;

in a negative half cycle of an AC connection terminal voltage of the I-type three-level circuit, when a freewheeling switching tube of the high-frequency arm bridge connected with the inductor is in ON state and a main switching tube of the high-frequency arm bridge connected with the inductor is in OFF state, controlling the freewheeling switching tube in ON state to keep in ON state and the main switching tube in OFF state to keep in OFF state if it is detected that the current of the inductor does not reach a preset positive current, and controlling the freewheeling switching tube in ON state to be turned off and the main switching tube in OFF state to be turned on if it is detected that the current of the inductor reaches the preset positive current.

Optionally, prior to controlling the freewheeling switching tube in ON state to keep in ON state and the main switching tube in OFF state to keep in OFF state, the method further includes:

determining that an instantaneous value of the AC connection terminal voltage of the I-type three-level circuit is greater than or equal to a half of a DC connection terminal voltage.

A control device for an I-type three-level circuit according to an embodiment of the present disclosure includes:

a detecting unit for detecting a current of an inductor connected with each of high-frequency arm bridges in an operation state in the I-type three-level circuit;

a control unit configured to, in a positive half cycle of an AC connection terminal voltage of the I-type three-level circuit, when a freewheeling switching tube of the high-frequency arm bridge connected with the inductor is in ON state and a main switching tube of the high-frequency arm bridge connected with the inductor is in OFF state, control the freewheeling switching tube in ON state to keep in ON state and the main switching tube in OFF state to keep in OFF state if it is detected that the current of the inductor does not reach a preset negative current, and control the freewheeling switching tube in ON state to be turned off and the main switching tube in OFF state to be turned on if it is detected that the current of the inductor reaches the preset negative current.

Optionally, the control unit is further configured to, prior to controlling the freewheeling switching tube in ON state to keep in ON state and the main switching tube in OFF state to keep in OFF state, determine that an instantaneous value of the AC connection terminal voltage of the I-type three-level circuit is greater than or equal to a half of a DC connection terminal voltage.

A control device for an I-type three-level circuit according to an embodiment of the present disclosure includes:

a detecting unit configured to detect a current of an inductor connected with each of high-frequency arm bridges in an operation state in the I-type three-level circuit;

a control unit configured to, in a negative half cycle of an AC connection terminal voltage of the I-type three-level circuit, when a freewheeling switching tube of the high-frequency arm bridge connected with the inductor is in ON state and a main switching tube of the high-frequency arm bridge connected with the inductor is in OFF state, control the freewheeling switching tube in ON state to keep in ON state and the main switching tube in OFF state to keep in OFF state if it is detected that the current of the inductor does not reach a preset positive current, and control the freewheeling switching tube in ON state to be turned off and the main switching tube in OFF state to be turned on if it is detected that the current of the inductor reaches the preset positive current.

Optionally, the control unit is further configured to, prior to controlling the freewheeling switching tube in ON state to keep in ON state and the main switching tube in OFF state to keep in OFF state, determine that an instantaneous value of the AC connection terminal voltage of the I-type three-level circuit is greater than or equal to a half of a DC connection terminal voltage.

In the solutions according to the embodiments of the present disclosure, when the freewheeling switching tube of the high-frequency bridge arm is in ON state and the main switching tube of the high-frequency bridge arm is in OFF state, the freewheeling switching tube and the main switching tube are controlled to keep in the current state till the current of the inductor connected with the high-frequency bridge arm is reversed, and then the freewheeling switching tube is controlled to be turned off and the main switching tube is controlled to be turned on. Zero-voltage turn on of the main switching tube and the freewheeling switching tube can be realized due to the reversed current, that is, zero-voltage turn on of the switching tube of the high-frequency bridge arm can be realized.

BRIEF DESCRIPTION OF THE DRAWINGS

The drawings are provided to further understand the present disclosure, and constitute a part of the specification. The drawings and the embodiments of the present disclosure together are used to explain the present disclosure, and are not intended to limit the present disclosure.

DETAILED DESCRIPTION OF EMBODIMENTS

In order to realize zero-voltage turn on of the switching tube of the high-frequency arm bridge in the I-type three-level circuit, a control method and device for an I-type three-level circuit are provided according to the embodiments of the present disclosure, the preferred embodiments of the present disclosure are illustrated in conjunction with the drawings, it should be understood that the preferred embodiments described here are only used to illustrate and explain the present disclosure, and are not used to limit the present disclosure. Without conflict, the embodiments of the present disclosure and features in the embodiments can be combined with each other.

Figure 3:
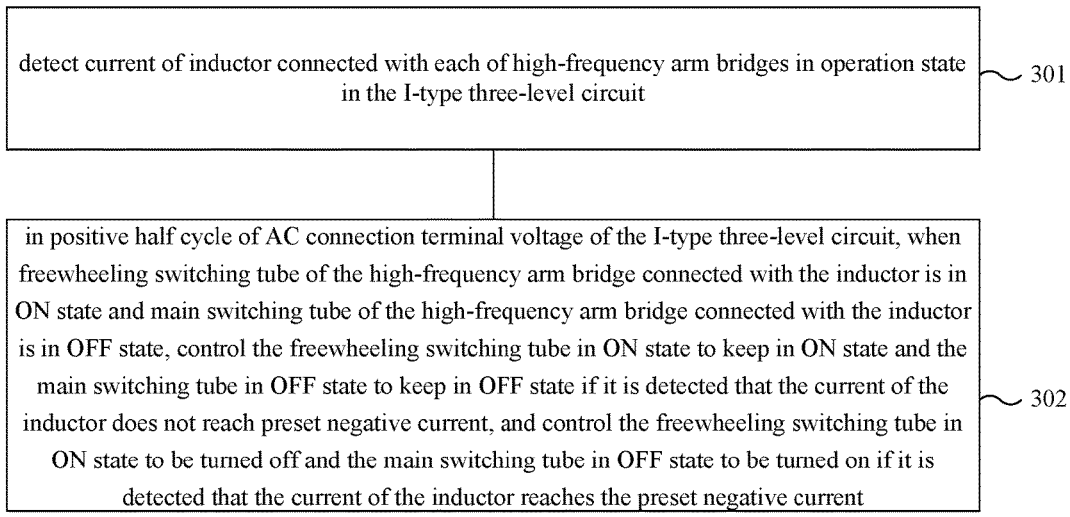
FIG. 3 is a schematic flow diagram of a control method for an I-type three-level circuit according to an embodiment of the present disclosure.

As shown in FIG. 3, a control method for an I-type three-level circuit according to an embodiment of the present disclosure may include the following steps:

In step 301, a current of an inductor connected with each of high-frequency arm bridges in an operation state in the I-type three-level circuit is detected.

In step 302, in a positive half cycle of an AC connection terminal voltage of the I-type three-level circuit, when a freewheeling switching tube of the high-frequency arm bridge connected with the inductor is in ON state and a main switching tube of the high-frequency arm bridge connected with the inductor is in OFF state, the freewheeling switching tube in ON state is controlled to keep in ON state and the main switching tube in OFF state is controlled to keep in OFF state if it is detected that the current of the inductor does not reach a preset negative current, or the freewheeling switching tube in ON state is controlled to be turned off and the main switching tube in OFF state is controlled to be turned on if it is detected that the current of the inductor reaches a preset negative current.

That is, ON time period of the freewheeling switching tube is extended, so that a reversed current occurs in the I-type three-level circuit. In the positive half cycle of the AC connection terminal voltage of the I-type three-level circuit, the reversed current is a negative current. Due to the negative current, the zero-voltage turn on of the switching tube of the high-frequency arm bridge can be realized in the positive half cycle of the AC connection terminal voltage of the I-type three-level circuit.

For the control of common inductor current continuous conduction mode such as Critical Conduction Mode (CRM) control for the I-type three-level circuit in conventional technology, the zero-voltage turn-on for the switching tube of the high-frequency bridge arm can be realized when an instantaneous value of the AC connection terminal voltage in the I-type three-level circuit is less than a half of the DC connection terminal voltage, but the zero-voltage turn-on for the switching tube of the high-frequency bridge arm cannot be realized when an instantaneous value of the AC connection terminal voltage in the I-type three-level circuit is greater than or equal to a half of the DC connection terminal voltage.

Thus, the control method for the I-type three-level circuit according to the embodiment of the present disclosure can be adopted only when an instantaneous value of the AC connection terminal voltage in the I-type three-level circuit is greater than or equal to a half of the DC connection terminal voltage. The control method for the I-type three-level circuit in the conventional technology is adopted when an instantaneous value of the AC connection terminal voltage in the I-type three-level circuit is less than a half of the DC connection terminal voltage.

In step 302, prior to controlling the freewheeling switching tube in ON state to keep in ON state and the main switching tube in OFF state to keep in OFF state, the method further includes: determining that an instantaneous value of the AC connection terminal voltage of the I-type three-level circuit is greater than or equal to a half of the DC connection terminal voltage.

Figure 4:
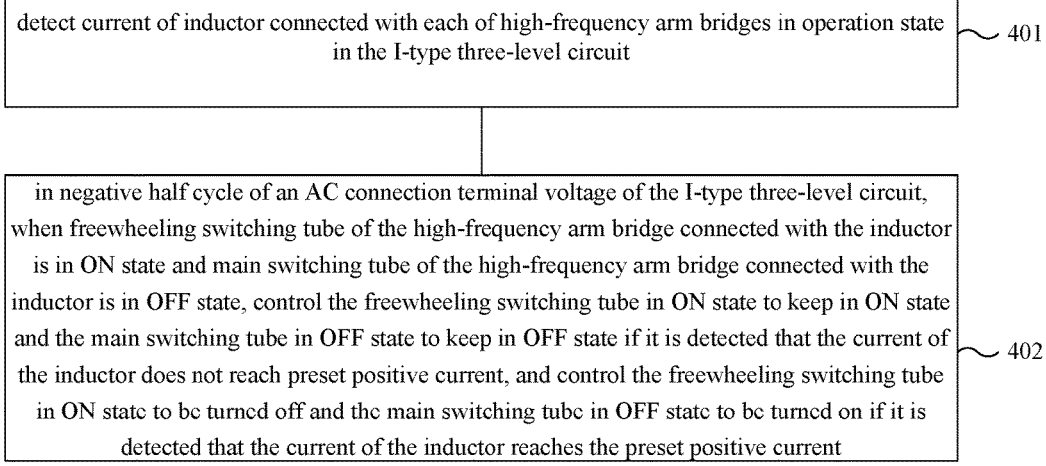
FIG. 4 is another schematic flow diagram of a control method for an I-type three-level circuit according to an embodiment of the present disclosure.

Correspondingly, as shown in FIG. 4, a control method for an I-type three-level circuit according to an embodiment of the present disclosure may include the following steps:

In step 401, a current of an inductor connected with each of high-frequency arm bridges in an operation state in the I-type three-level circuit is detected.

In step 402, in a negative half cycle of an AC connection terminal voltage of the I-type three-level circuit, when a freewheeling switching tube of the high-frequency arm bridge connected with the inductor is in ON state and a main switching tube of the high-frequency arm bridge connected with the inductor is in OFF state, the freewheeling switching tube in ON state is controlled to keep in ON state and the main switching tube in OFF state is controlled to keep in OFF state if it is detected that the current of the inductor does not reach a preset positive current; the freewheeling switching tube in ON state is controlled to be turned off and the main switching tube in OFF state is controlled to be turned on if it is detected that the current of the inductor reaches a preset positive current.

That is, the ON time period of the freewheeling switching tube is extended, so that a reversed current occurs in the I-type three-level circuit. In a negative half cycle of the AC connection terminal voltage of the I-type three-level circuit, the reversed current is a positive current. Due to the positive current, the zero-voltage turn on of the switching tube of the high-frequency arm bridge can be realized in the negative half cycle of the AC connection terminal voltage of the I-type three-level circuit.

Optionally, prior to controlling the freewheeling switching tube in ON state to keep in ON state and the main switching tube in OFF state to keep in OFF state, the method further includes determining that an instantaneous value of the AC connection terminal voltage of the I-type three-level circuit is greater than or equal to a half of a DC connection terminal voltage.

Of course, the control method for the I-type three-level circuit according to the embodiment of the present disclosure can also be adopted when an instantaneous value of the AC connection terminal voltage of the I-type three-level circuit is less than a half of the DC connection terminal voltage.

That is, when an instantaneous value of the AC connection terminal voltage of the I-type three-level circuit is greater than or equal to a half of the DC connection terminal voltage, a reversed current is necessary to realize zero-voltage turn on of the switching tube of the high-frequency bridge arm; when an instantaneous value of the AC connection terminal voltage of the I-type three-level circuit is less than a half of the DC connection terminal voltage, the zero-voltage turn on of the switching tube of the high-frequency bridge arm can be realized either with or without the reversed current.

In the control method for the I-type three-level circuit according to the embodiments of the present disclosure, the current of the inductor is detected in step 301 and step 401 described above, the current of the inductor can be directly sampled, alternatively, a current of the switching tube can be sampled, and the current of the inductor can be calculated.

Figure 1:
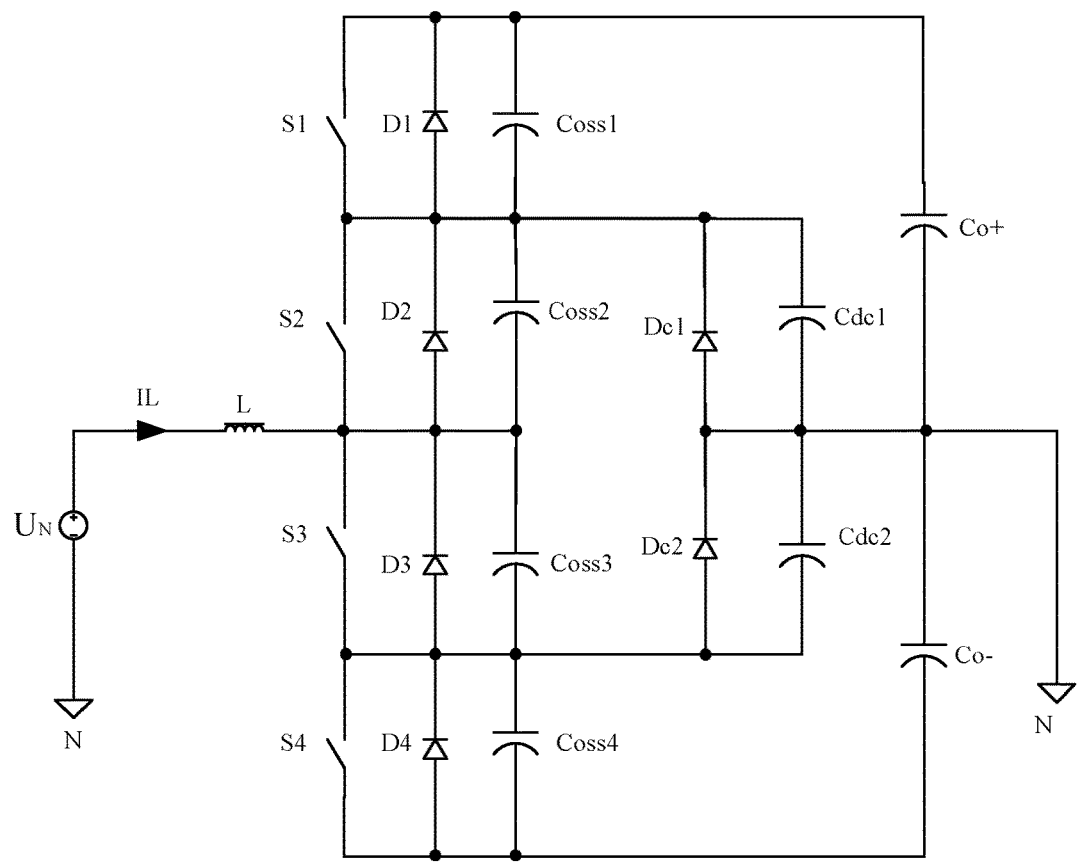
FIG. 1 is a schematic structural diagram of an I-type three-level circuit.
Figure 2:
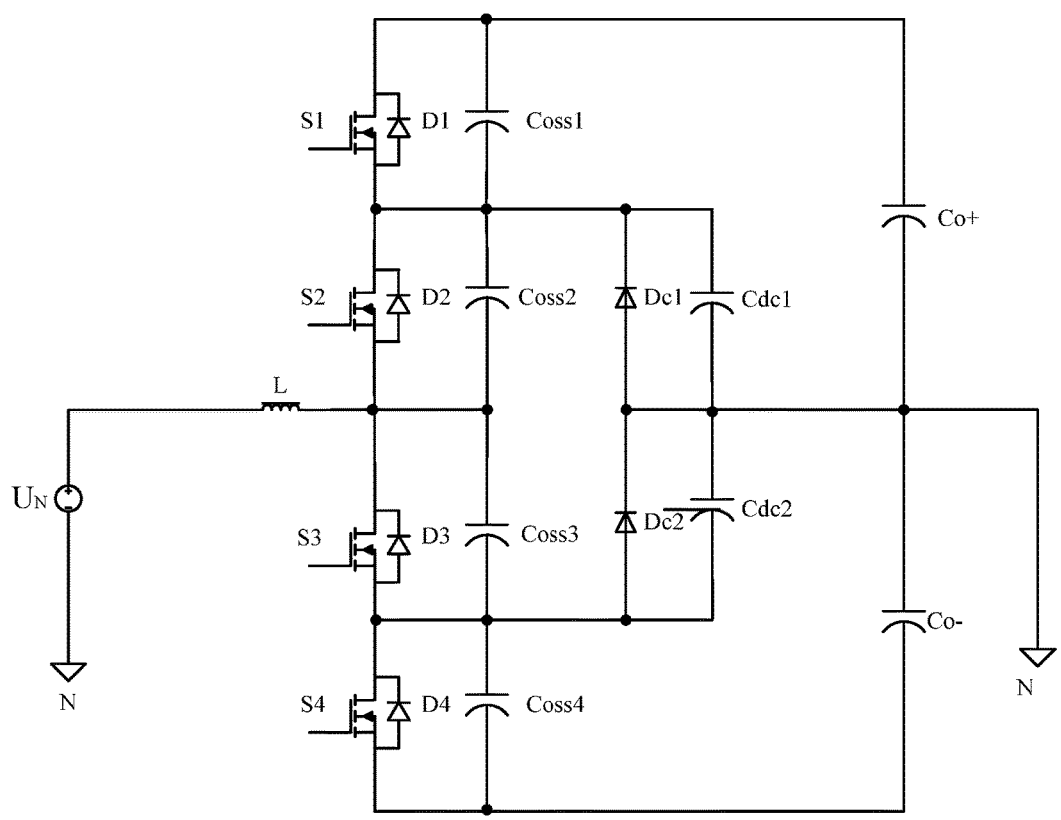
FIG. 2 is another schematic structural diagram of an I-type three-level circuit.

The control method for the I-type three-level circuit according to the embodiment of the present disclosure can be but not limited to be applied into the I-type three-level circuit shown in FIG. 1 and FIG. 2. Taking the I-type three-level circuit shown in FIG. 2 as an example, an operation state of the I-type three-level circuit to which the control method for the I-type three-level circuit according to the embodiment of the present disclosure is applied is described.

Figure 5:
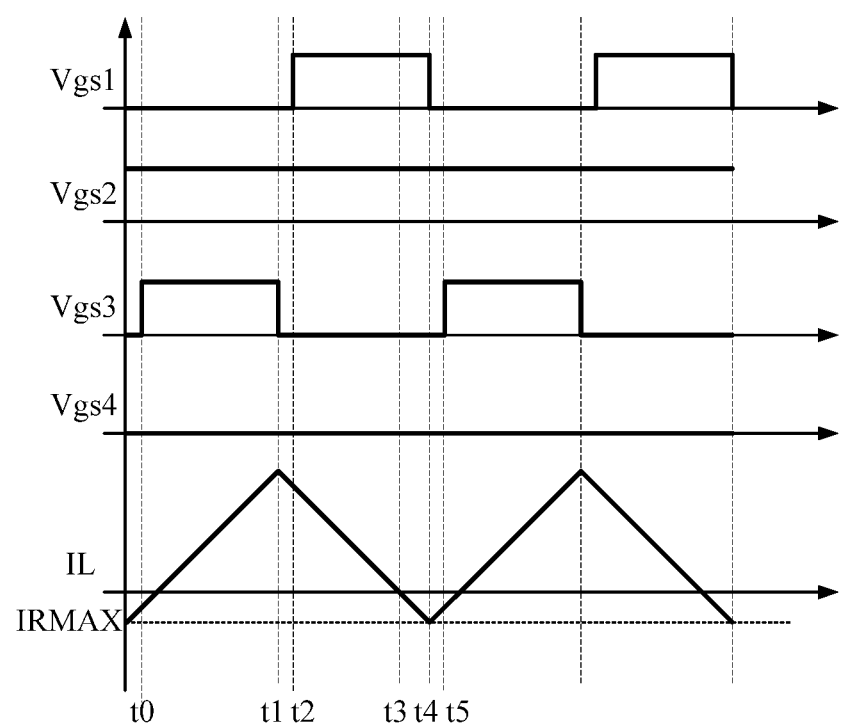
FIG. 5 is a schematic diagram of a driving signal of a switching tube of a high-frequency arm bridge in an I-type three-level circuit according to an embodiment of the present disclosure.

In a positive half cycle of the AC connection terminal voltage $U_N$ of the I-type three-level circuit shown in FIG. 2, a switching tube S1 is a freewheeling switching tube, a switching tube S2 is in ON state, a switching tube S3 is a main switching tube, a switching tube S4 is in OFF state. In consideration of a dead time, a drive signal Vgs1 of the switching tube S1, a drive signal Vgs2 of the switching tube S2, a drive signal Vgs3 of the switching tube S3 and a drive signal Vgs4 of the switching tube S4 are shown in FIG. 5, IL is a current of an inductor L connected to a high-frequency bridge arm composed of switching tubes S1, S2, S3 and S4, IRMAX is a preset negative current, a time period from t0 to t5 is a switching period.

Figure 6A:
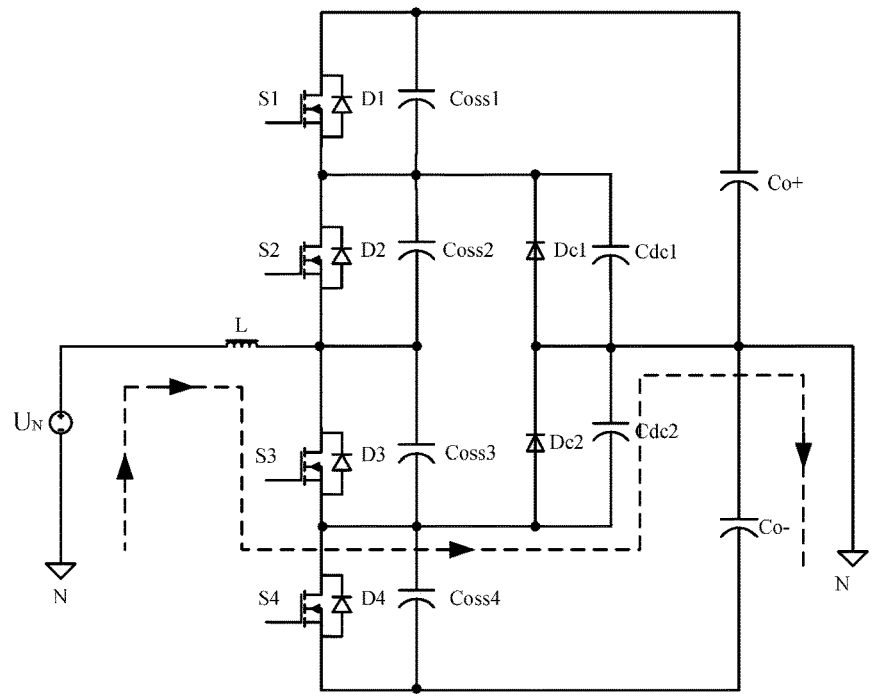
FIG. 6(a) is a schematic diagram of an operation state of an I-type three-level circuit according to an embodiment of the present disclosure.

In a time period from t0 to t1, the main switching tube S3 is in ON state, the freewheeling switching tube S1 is in OFF state, an operation state of the I-type three-level circuit shown in FIG. 2 is shown in FIG. 6(a), a negative current of the inductor is decreased to 0 gradually, a direction of the current of the inductor is changed from a negative direction to a positive direction, and a positive current of the inductor is increased gradually.

Figure 6B:
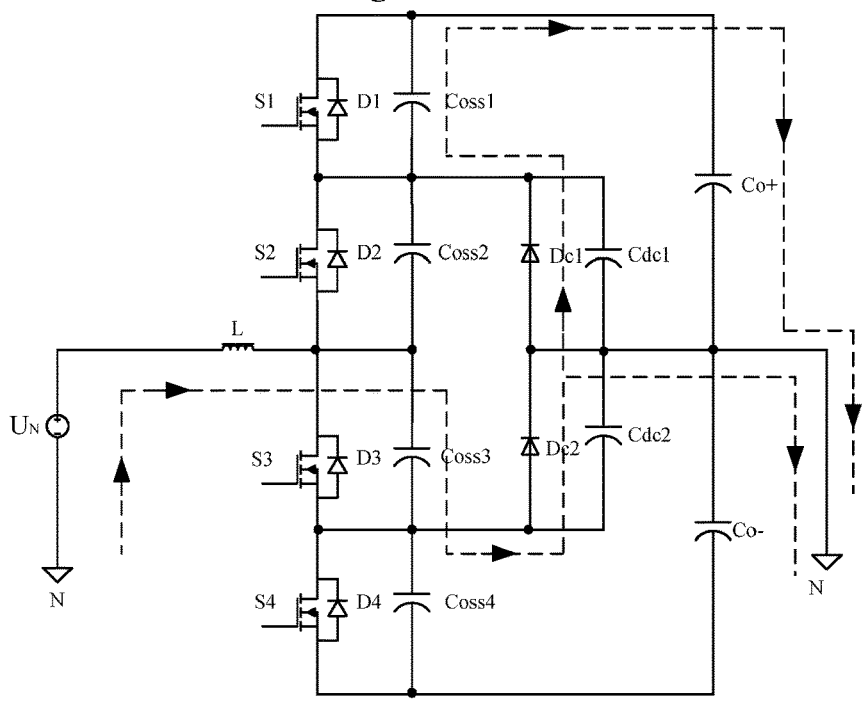
FIG. 6(b) is another schematic diagram of an operation state of an I-type three-level circuit according to an embodiment of the present disclosure.

In a time period from t1 to t2, each of the main switching tube S3 and the freewheeling switching tube S1 is in OFF state, the time period is a dead time $T_{XZ1}$ during which the main switching tube S3 and the freewheeling switching tube S1 are turned on complementarily, an operation state of the I-type three-level circuit shown in FIG. 2 is shown in FIG. 6(b), an equivalent junction capacitor Coss1 of the freewheeling switching tube S1 is discharged, an equivalent junction capacitor Coss3 of the main switching tube S3 and an equivalent junction capacitor Cdc1 of the clamp diode Dc1 are charged, the positive current of the inductor is decreased gradually.

Figure 6C:
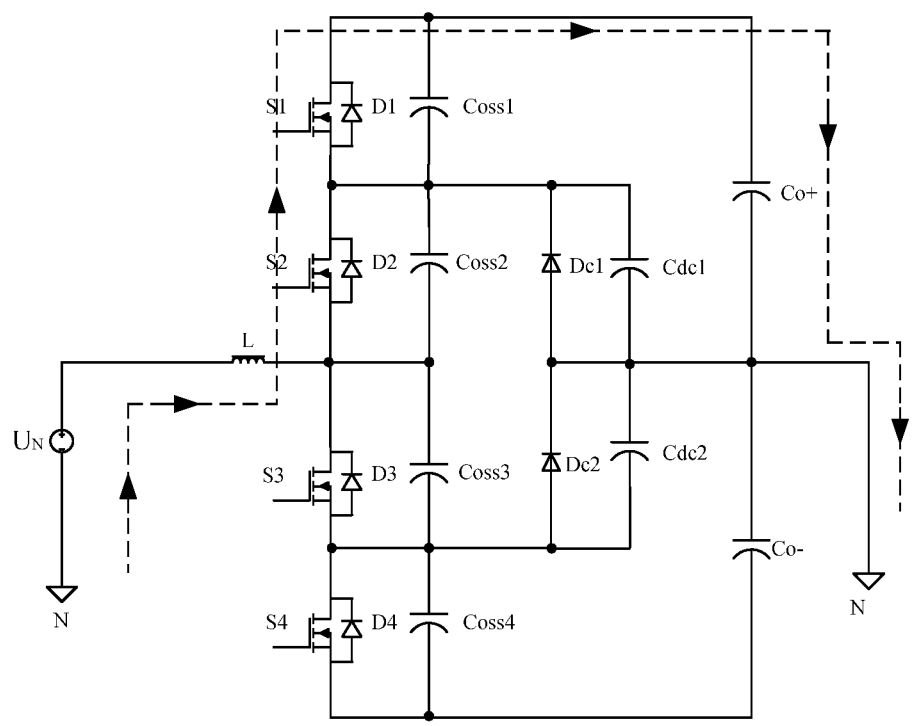
FIG. 6(c) is yet another schematic diagram of an operation state of an I-type three-level circuit according to an embodiment of the present disclosure.

In a time period from t2 to t3, the main switching tube S3 is in OFF state, and the freewheeling switching tube S1 is in ON state, an operation state of the I-type three-level circuit shown in FIG. 2 is shown in FIG. 6(c), the positive current of the inductor is decreased to 0 gradually.

Obviously, turn on of the freewheeling switching tube S1 at t2 is zero-voltage turn on.

Figure 6D:
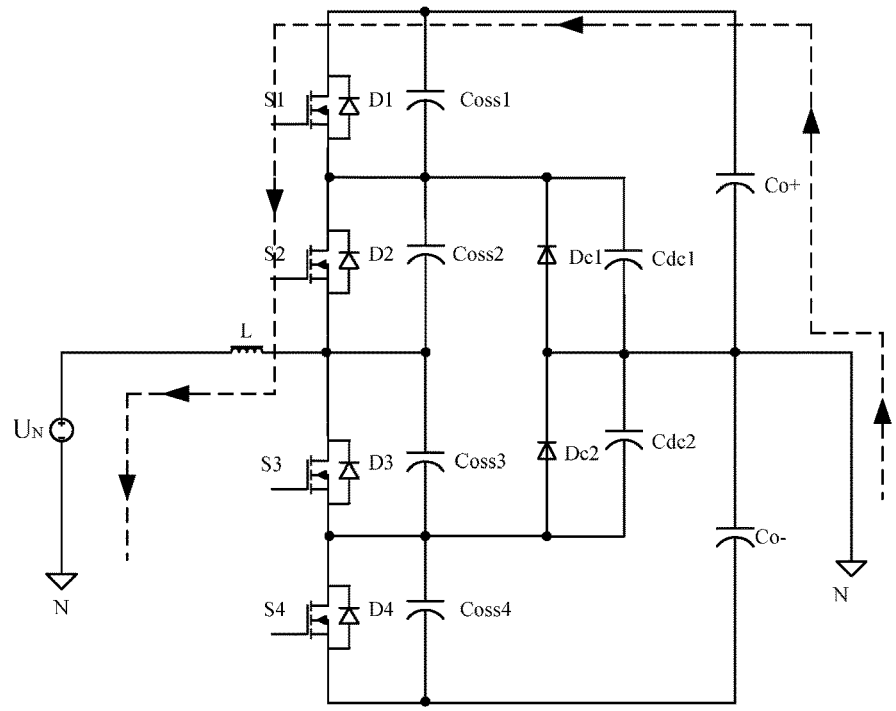
FIG. 6(d) is still another schematic diagram of an operation state of an I-type three-level circuit according to an embodiment of the present disclosure.

In a time period from t3 to t4, the main switching tube S3 keeps in OFF state, the freewheeling switching tube S1 keeps in ON state, an operation state of the I-type three-level circuit shown in FIG. 2 is shown in FIG. 6(d), a direction of the current of the inductor is changed from the positive direction to the negative direction, and the negative current of the inductor is increased gradually to reach a preset negative current IRMAX.

In a time period from t4 to t5, each of the main switching tube S3 and the freewheeling switching tube S1 is in OFF state, the time period includes two sub time periods.

Figure 6E:
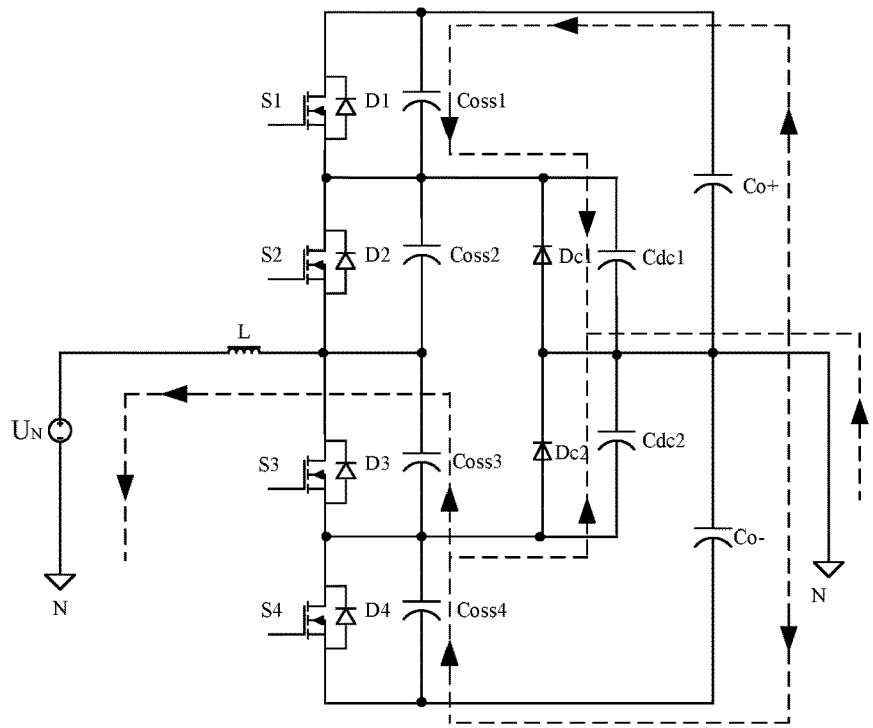
FIG. 6(e) is yet another schematic diagram of an operation state of an I-type three-level circuit according to an embodiment of the present disclosure.

A first sub time period is a dead time $T_{XZ2}$ during which the main switching tube S3 and the freewheeling switching tube S1 are turned on complementarily. At this time, an operation state of the I-type three-level circuit shown in FIG. 2 is shown in FIG. 6(e), the equivalent junction capacitor Coss1 of the freewheeling switching tube S1, an equivalent junction capacitor Cdc2 of the clamp diode Dc2 are charged, the equivalent junction capacitor Coss3 of the main switching tube S3 are discharged.

Figure 6F:
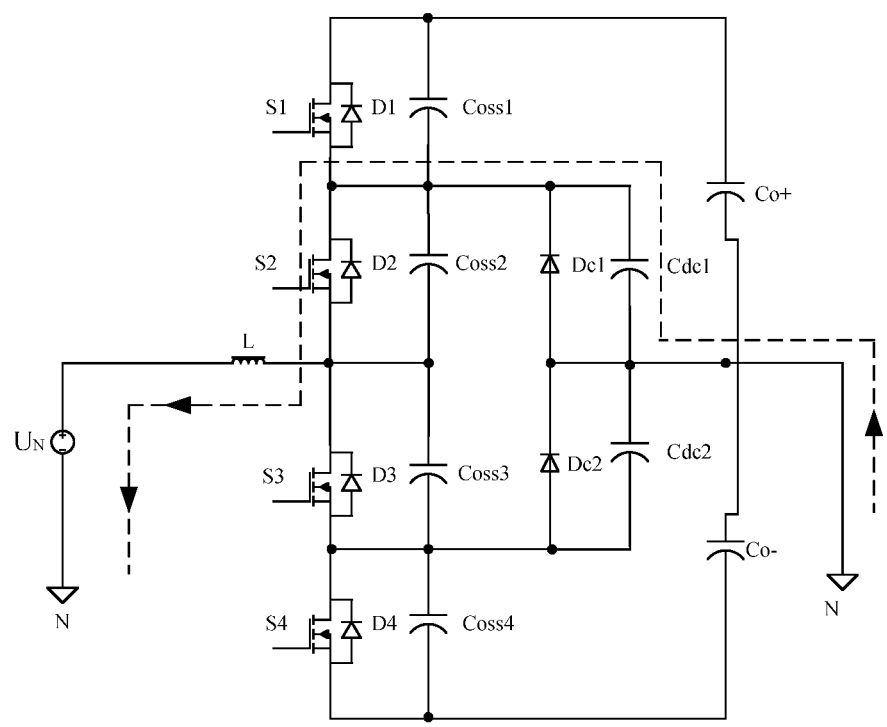
FIG. 6(f) is still another schematic diagram of an operation state of an I-type three-level circuit according to an embodiment of the present disclosure.

A second sub time period is a reversed time $T_F$, at this time, an operation state of the I-type three-level circuit shown in FIG. 2 is shown in FIG. 6(f), the negative current of the inductor is decreased gradually.

Obviously, turn on of the main switching tube S3 at t0 is zero-voltage turn on.

Specifically, the reversed time $T_F$ in the time period from t4 to t5 may be determined according to the formula:

$$T_F = \frac{L \times IRMAX}{U_O - U_N}$$

where $U_o$ is a DC connection terminal voltage of the I-type three-level circuit shown in FIG. 2.

That is, the length of the time period from t4 to t5 can be determined, among the time periods, the length of the time period from t0 to t1, the length of the time period from t2 to t3 and the length of the time period from t3 to t4 need to be determined. In a case that the switching period is known, the length of the time period from t2 to t3 can be determined if the length of the time period from t0 to t1 and the length of the time period from t3 to t4 are determined.

There are innumerable combinations of the length of the time period from t0 to t1 and the length of the time period from t3 to t4. The shorter the length of the time period from t0 to t1, the longer the time period from t3 to t4, and the less the current of the inductor, so that the loss of the inductor is less. The longer the length of the time period from t0 to t1, the shorter the length of the time period from t3 to t4, and the less OFF current of the main switching tube S3, so that the OFF loss of the main switching tube S3 is less. Therefore, the length of the time period from t1 to t1 and the length of the time period from t3 to t4 can be determined according to requirements of a specific application scenario in actual applications.

It can be seen from the operation state of the circuit described above that, in the positive half cycle of the AC connection terminal voltage $U_N$ of the I-type three-level circuit shown in FIG. 2, with the control method for the I-type three-level circuit according to the embodiments of the present disclosure, the zero-voltage turn on of the main switching tube S3 can be realized, and reverse recovery loss of the diode D1 corresponding to the freewheeling switching tube S1 can be eliminated, and zero-voltage turn on and near-zero-current turn off of the freewheeling switching tube S1 can be realized.

In the negative half cycle of the AC connection terminal voltage $U_N$ of the I-type three-level circuit shown in FIG. 2, the switching tube S1 is in OFF state, the switching tube S2 is a main switching tube, the switching tube S3 is in ON state, and the switching tube S4 is a freewheeling tube. The operation state of the circuit is similar to that in the positive half cycle of the AC connection terminal voltage $U_N$, which is not described in detail here.

In the negative half cycle of the AC connection terminal voltage $U_N$ of the I-type three-level circuit shown in FIG. 2, with the control method for the I-type three-level circuit according to the embodiments of the present disclosure, zero-voltage turn on of the main switching tube S2 can be realized, and reverse recovery loss of the diode D4 corresponding to the freewheeling switching tube S4 can be eliminated, and zero-voltage turn on and near-zero-current turn off for the freewheeling switching tube S4 can be realized.

It can be seen that, with the control method for the I-type three-level circuit according to the embodiments of the present disclosure, when the freewheeling switching tube of the high-frequency bridge arm is in ON state and the main switching tube of the high-frequency bridge arm is in OFF state, the freewheeling switching tube and the main switching tube are controlled to keep in the current state till the current of the inductor connected with the high-frequency bridge arm is reversed, and then the freewheeling switching tube is controlled to be turned off and the main switching tube is controlled to be turned on. The zero-voltage turn on of the switching tube of the high-frequency bridge arm can be realized due to the reversed current, thereby circuit loss is reduced and circuit efficiency is improved.

Figure 7:
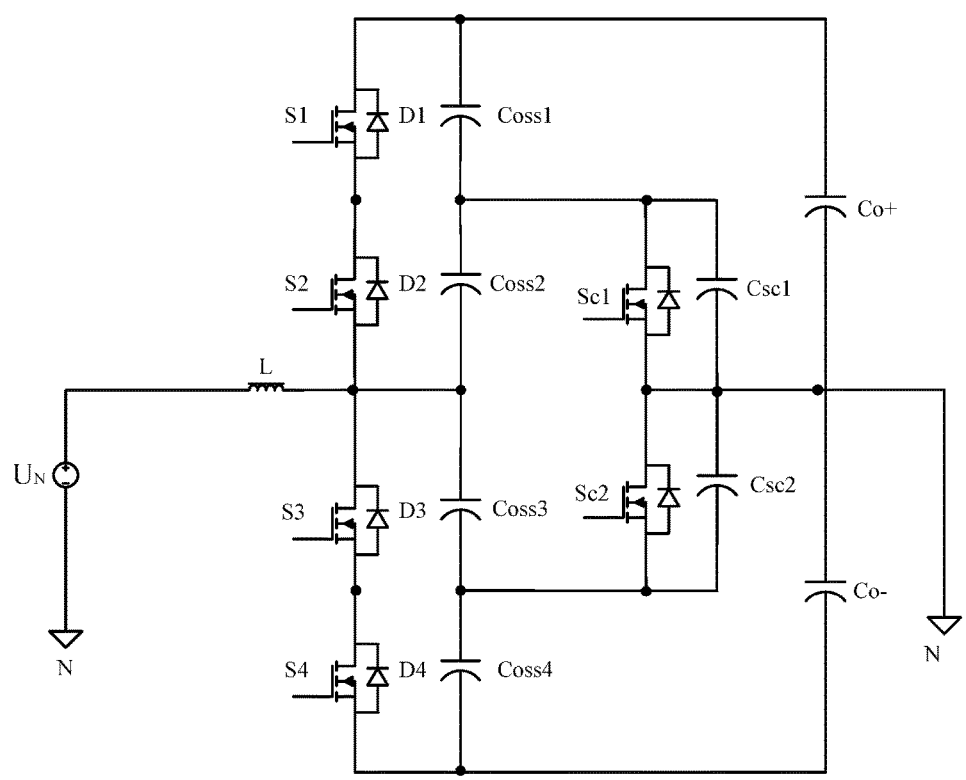
FIG. 7 is yet another schematic structural diagram of an I-type three-level circuit.
Figure 8:
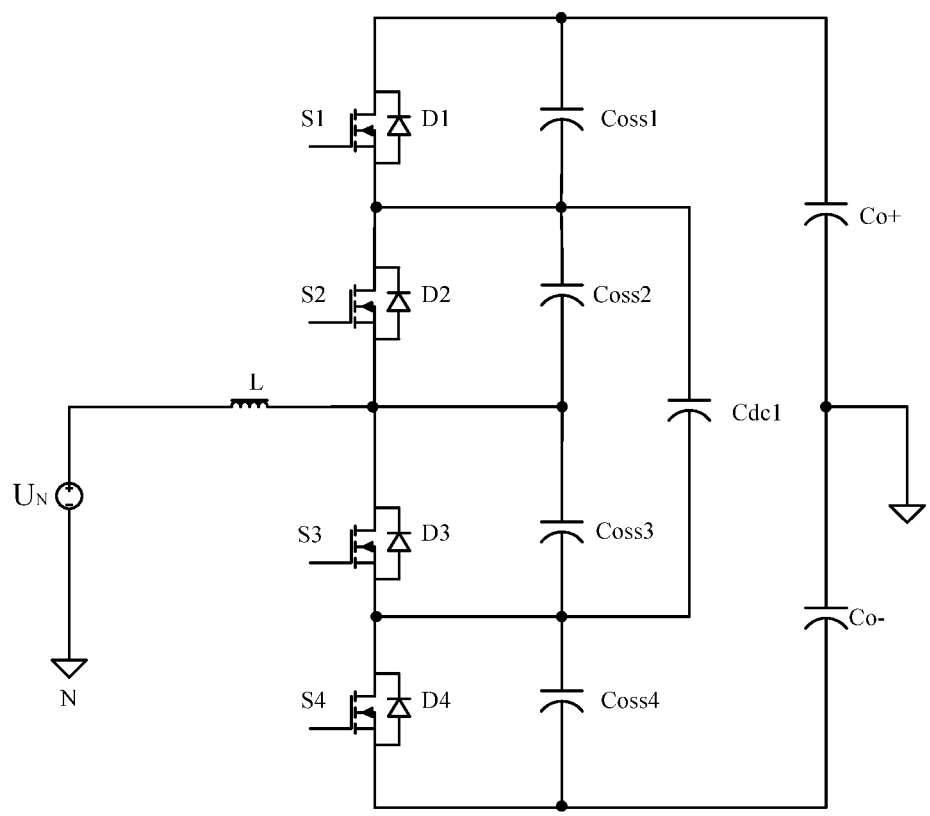
FIG. 8 is still another schematic structural diagram of an I-type three-level circuit.
Figure 9:
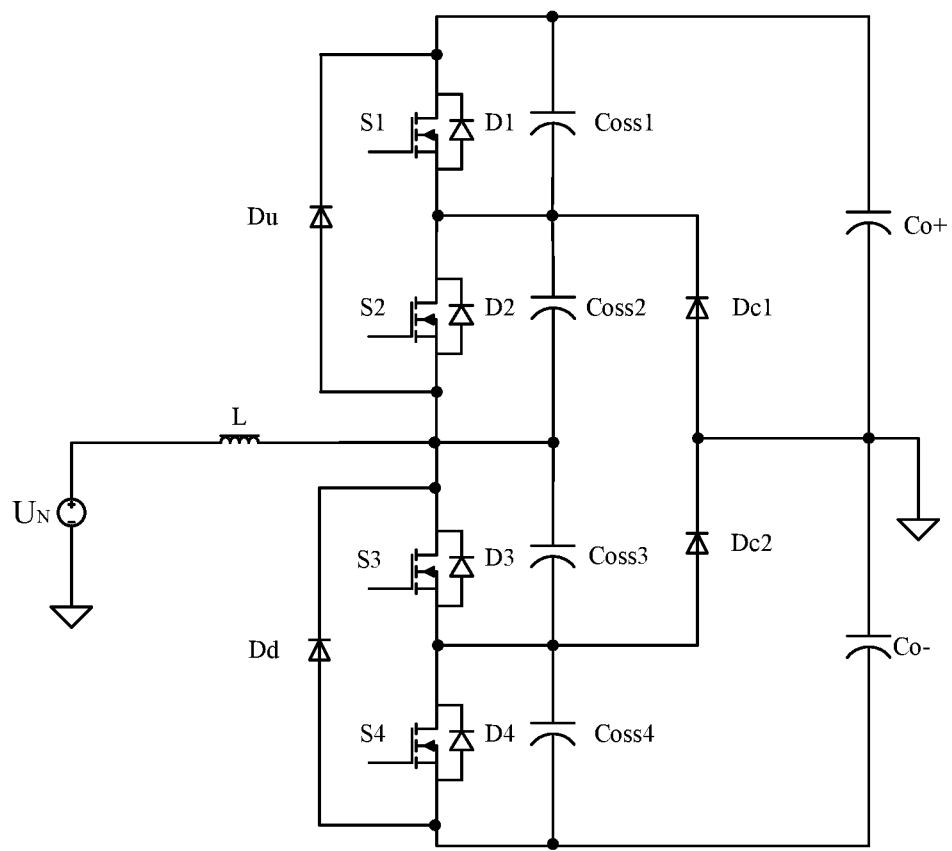
FIG. 9 is yet another schematic structural diagram of an I-type three-level circuit.

I-type three-level circuits shown in FIG. 7 to FIG. 9 are variants of the I-type three-level circuit shown in FIG. 2, the control method for the I-type three-level circuit according to the embodiments of the present disclosure can also be applied into the I-type three-level circuits shown in FIG. 7 to FIG. 9.

Figure 10:
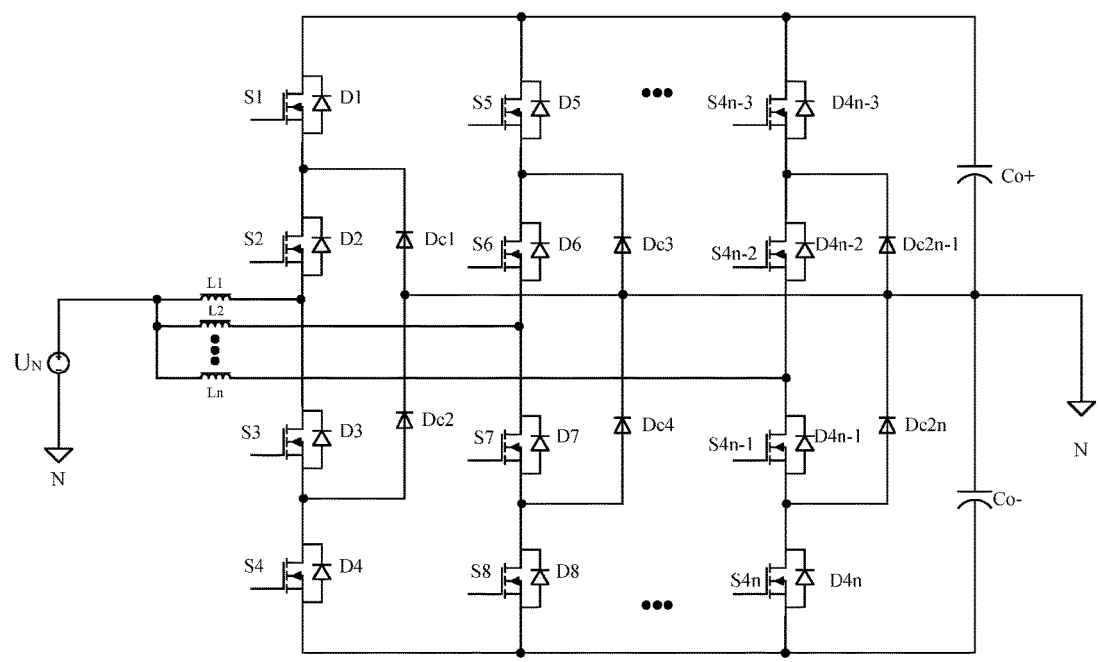
FIG. 10 is still another schematic structural diagram of an I-type three-level circuit.
Figure 11:
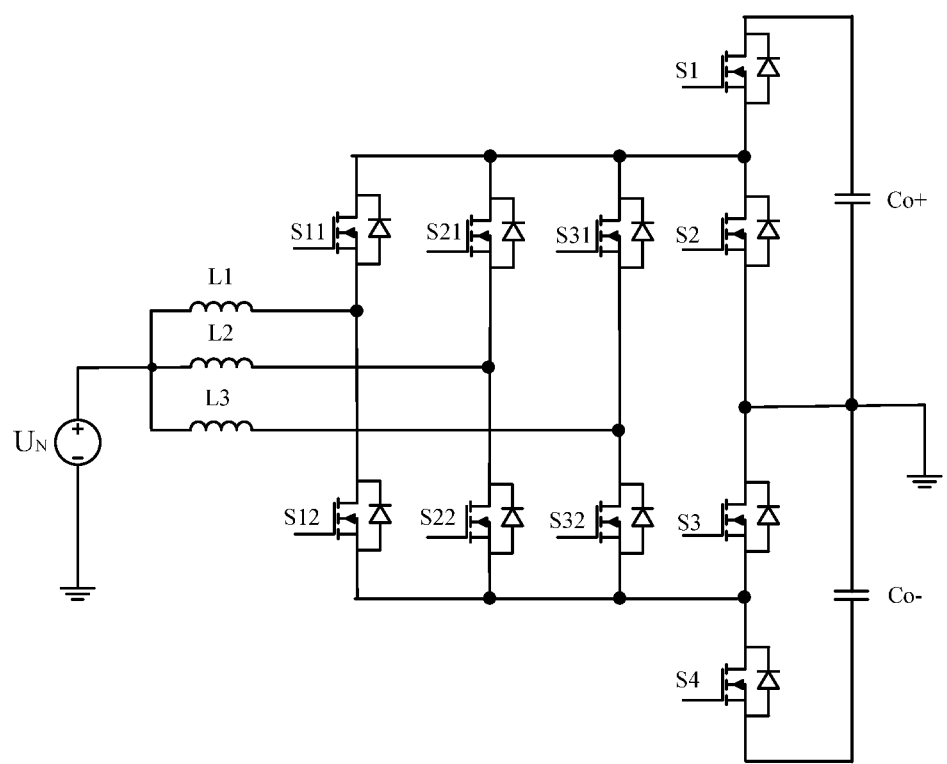
FIG. 11 is yet another schematic structural diagram of an I-type three-level circuit.
Figure 12:
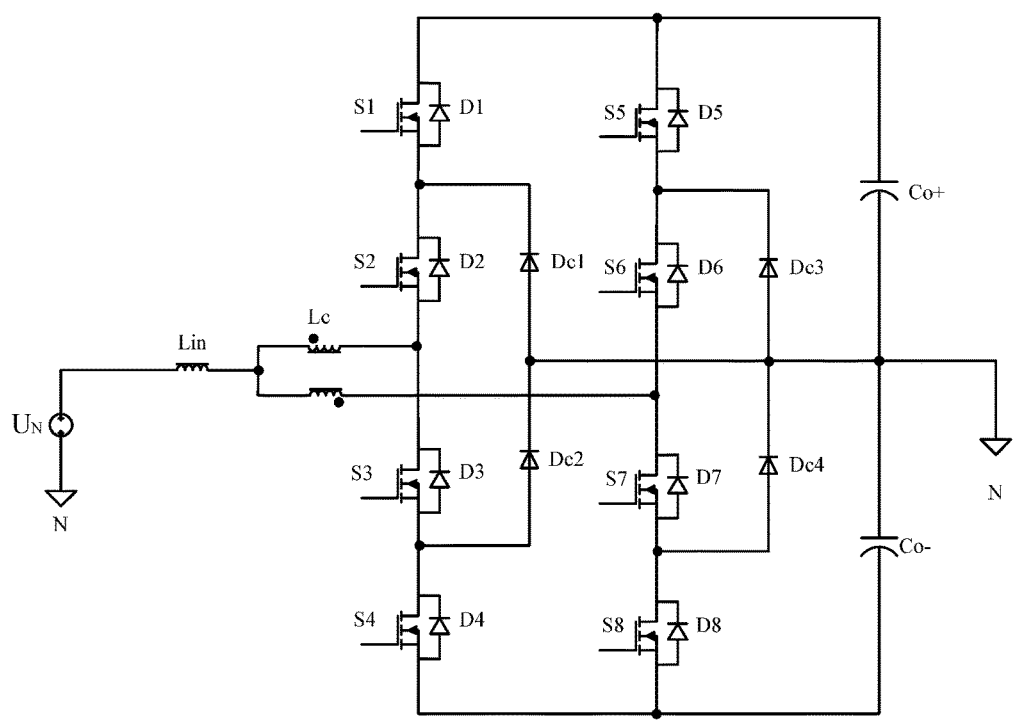
FIG. 12 is still another schematic structural diagram of an I-type three-level circuit.
Figure 13:
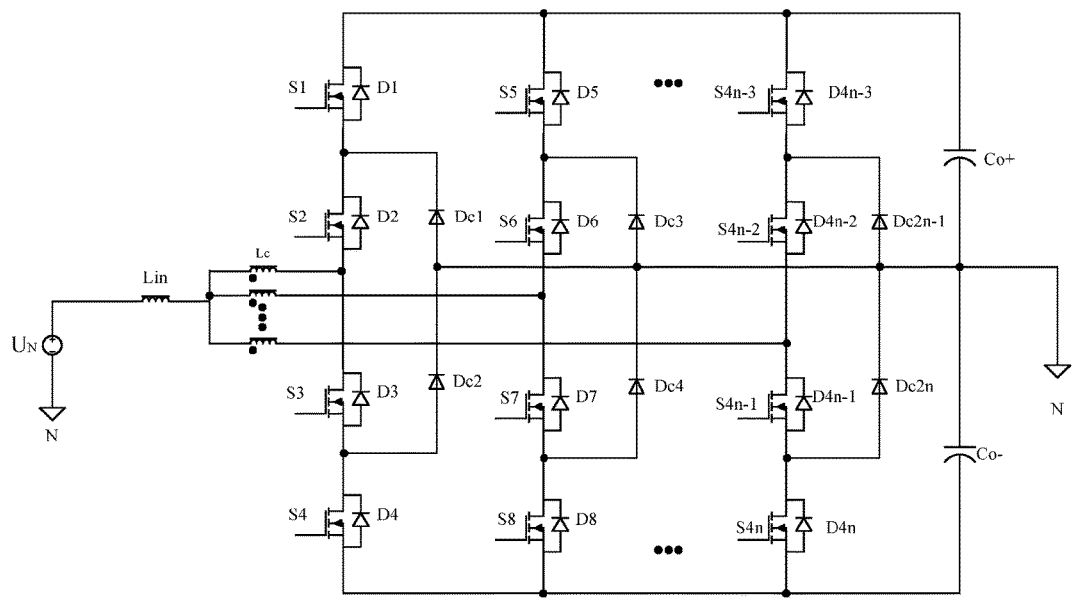
FIG. 13 is yet another schematic structural diagram of an I-type three-level circuit.
Figure 14:
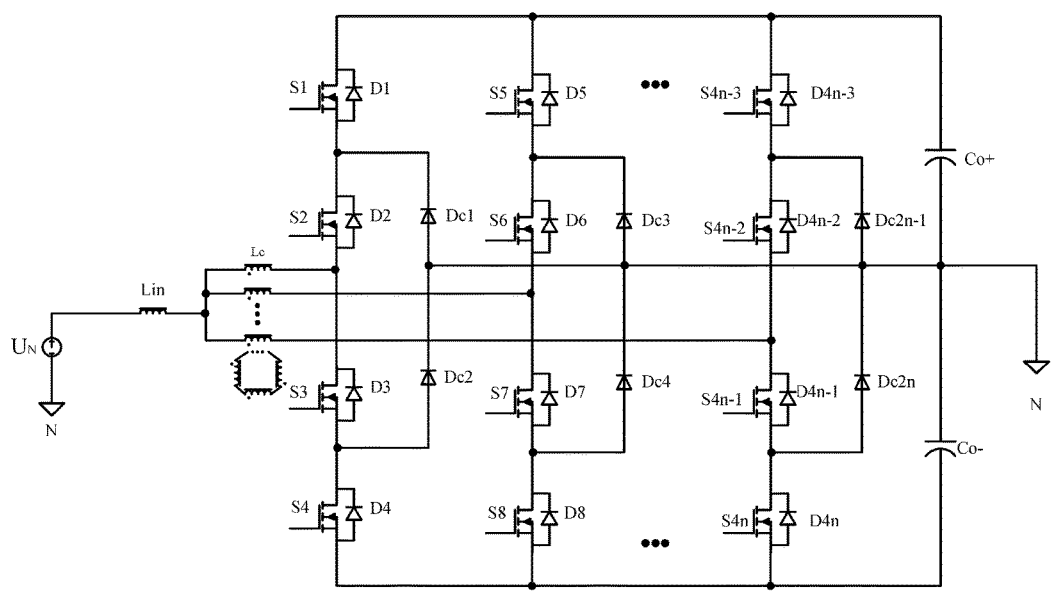
FIG. 14 is still another schematic structural diagram of an I-type three-level circuit.
Figure 15:
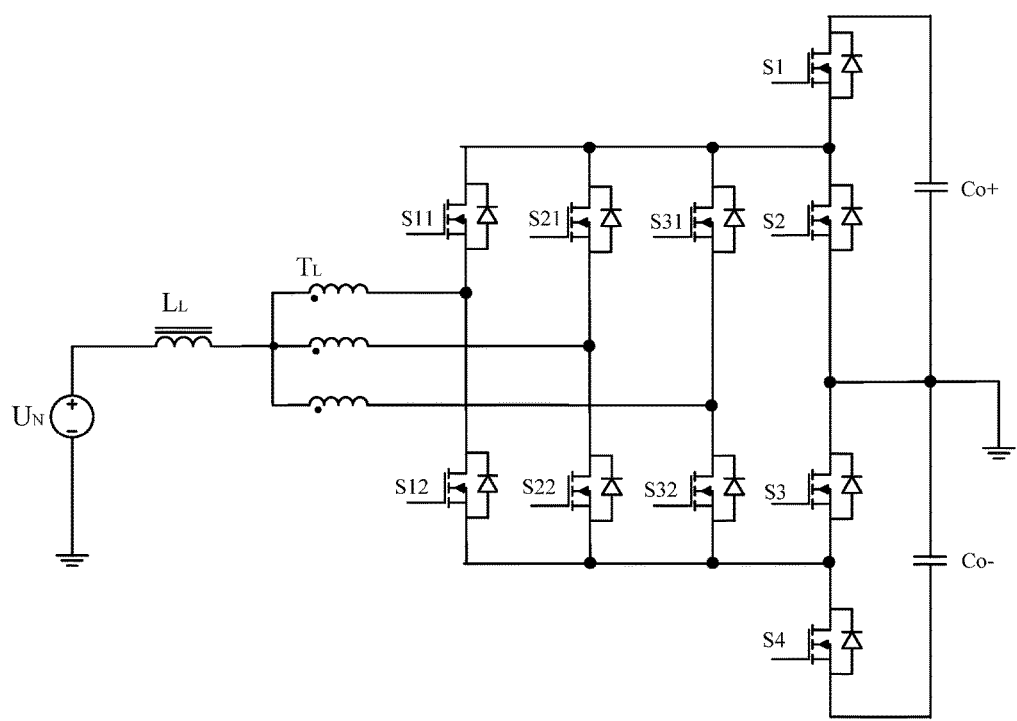
FIG. 15 is yet another schematic structural diagram of an I-type three-level circuit.

The control method for the I-type three-level circuit according to the embodiments of the present disclosure can also be applied into interleaved I-type three-level circuits connected in parallel shown in FIG. 10 and FIG. 11.

Compared with the I-type three-level circuits shown in FIG. 1, FIG. 2 and FIG. 7 to FIG. 9, in the interleaved I-type three-level circuits connected in parallel shown in FIG. 10 and FIG. 11, input current ripple of the circuit can be reduced, and Total Harmonic Distribution (THDi) and Power Factor (PF) of the circuit can be improved. In order to ensure equal distribution for currents of inductors, a current-sharing control loop can be added in control.

The control method for the I-type three-level circuit according to the embodiments of the present disclosure can also be applied into multi-state switching I-type three-level circuits shown in FIG. 12 to FIG. 15.

A coupling inductor or a voltage control is used in the multi-state switching I-type three-level circuits shown in FIG. 12 to FIG. 15, to perform automatic current sharing. Compared to the interleaved I-type three-level circuits connected in parallel shown in FIG. 10 and FIG. 11, the multi-state switching I-type three-level circuits have advantages of the interleaved I-type three-level circuits connected in parallel, and does not has an uneven current problem in the interleaved I-type three-level level circuits connected in parallel.

Figure 16:
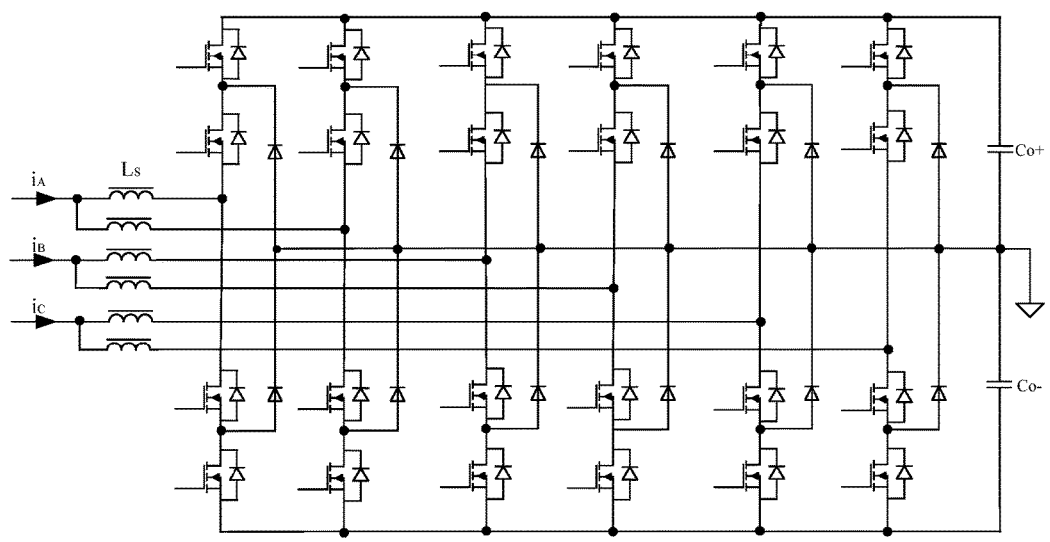
FIG. 16 is still another schematic structural diagram of an I-type three-level circuit.

Each of the I-type three-level circuits shown in FIG. 1, FIG. 2, FIG. 7 to FIG. 15 is a single-phase I-type three-level circuit. The control method for the I-type three-level circuit according to the embodiments of the present disclosure can also be applied into various three-phase I-type three-level circuits, for example, a three-phase I-type three-level circuit shown in FIG. 16.

Figure 17:
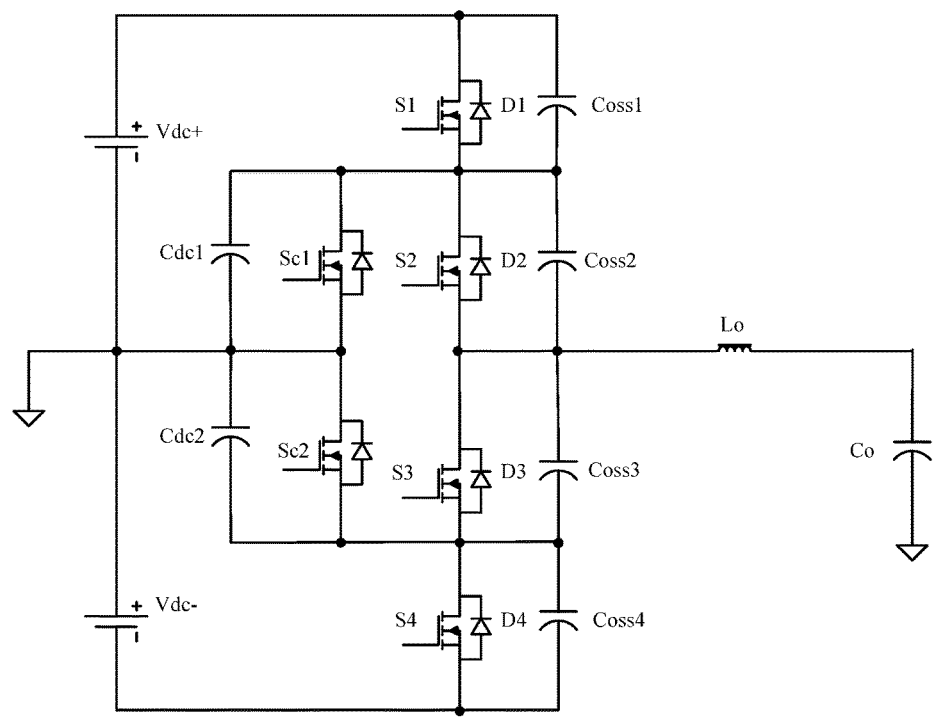
FIG. 17 is yet another schematic structural diagram of an I-type three-level circuit.

Each of the I-type three-level circuits shown in FIG. 1, FIG. 2, FIG. 7 to FIG. 16 is an I-type three-level rectifier circuit. The control method for the I-type three-level circuit according to the embodiments of the present disclosure can also be applied into various I-type three-level inverter circuits, for example, an I-type three-level inverter circuit shown in FIG. 17.

Of course, the control method for the I-type three-level circuit according to the embodiments of the present disclosure can also be applied into other I-type three-level circuits, which are not exemplified here.

Figure 18:
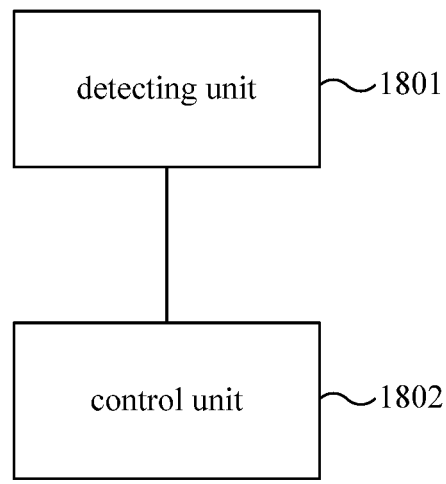
FIG. 18 is a schematic structural diagram of a control device for an I-type three-level circuit according to an embodiment of the present disclosure.

According to the same invention concept, control methods for the I-type three-level circuit according to the embodiments of the present disclosure are described above, a control device for an I-type three-level circuit is also provided correspondingly according to an embodiment of the present disclosure, as shown in FIG. 18, the device includes:

A detecting unit 1801 configured to detect a current of an inductor connected with each of high-frequency arm bridges in an operation state in the I-type three-level circuit.

A control unit 1802 configured to, in a positive half cycle of an AC connection terminal voltage of the I-type three-level circuit, when a freewheeling switching tube of the high-frequency arm bridge connected with the inductor is in ON state and a main switching tube of the high-frequency arm bridge connected with the inductor is in OFF state, control the freewheeling switching tube in ON state to keep in ON state and the main switching tube in OFF state to keep in OFF state if it is detected that the current of the inductor does not reach a preset negative current, and control the freewheeling switching tube in ON state to be turned off and the main switching tube in OFF state to be turned on if it is detected that the current of the inductor reaches the preset negative current.

Optionally, the control unit 1802 is further configured to, prior to controlling the freewheeling switching tube in ON state to keep in ON state and the main switching tube in OFF state to keep in OFF state, determine that an instantaneous value of the AC connection terminal voltage of the I-type three-level circuit is greater than or equal to a half of a DC connection terminal voltage.

According to the same invention concept, the control methods for the I-type three-level circuit according to the embodiments of the present disclosure are described above, a control device for an I-type three-level circuit is also provided correspondingly according to an embodiment of the present disclosure, as shown in FIG. 18, the device includes:

A detecting unit 1901 configured to detect a current of an inductor connected with each of high-frequency arm bridges in an operation state in the I-type three-level circuit.

A control unit 1902 configured to, in a negative half cycle of an AC connection terminal voltage of the I-type three-level circuit, when a freewheeling switching tube of the high-frequency arm bridge connected with the inductor is in ON state and a main switching tube of the high-frequency arm bridge connected with the inductor is in OFF state, control the freewheeling switching tube in ON state to keep in ON state and the main switching tube in OFF state to keep in OFF state if it is detected that the current of the inductor does not reach a preset positive current, and control the freewheeling switching tube in ON state to be turned off and the main switching tube in OFF state to be turned on if it is detected that the current of the inductor reaches the preset positive current.

Optionally, the control unit 1902 is further configured to, prior to controlling the freewheeling switching tube in ON state to keep in ON state and the main switching tube in OFF state to keep in OFF state, determine that an instantaneous value of the AC connection terminal voltage of the I-type three-level circuit is greater than or equal to a half of a DC connection terminal voltage.

The function of each unit may refer to the embodiments of the control method for the I-type three-level circuit described above, which is not described in detail here.

Figure 19:
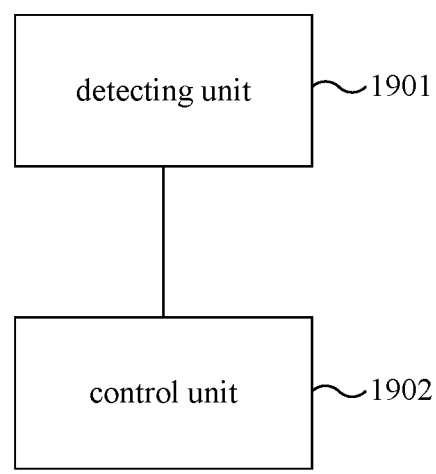
FIG. 19 is another schematic structural diagram of a control device for an I-type three-level circuit according to an embodiment of the present disclosure.

Furthermore, the function of the control device shown in FIG. 18 and the function of the control device shown in FIG. 19 may be realized by a same control device.

In this case, a function of the detecting unit 1801 in FIG. 18 and a function of the detecting unit 1901 in FIG. 19 can be realized by a same detecting unit, and a function of the control unit 1802 in FIG. 18 and a function of the control unit 1902 in FIG. 19 can be realized by a same control unit.

Figure 20:
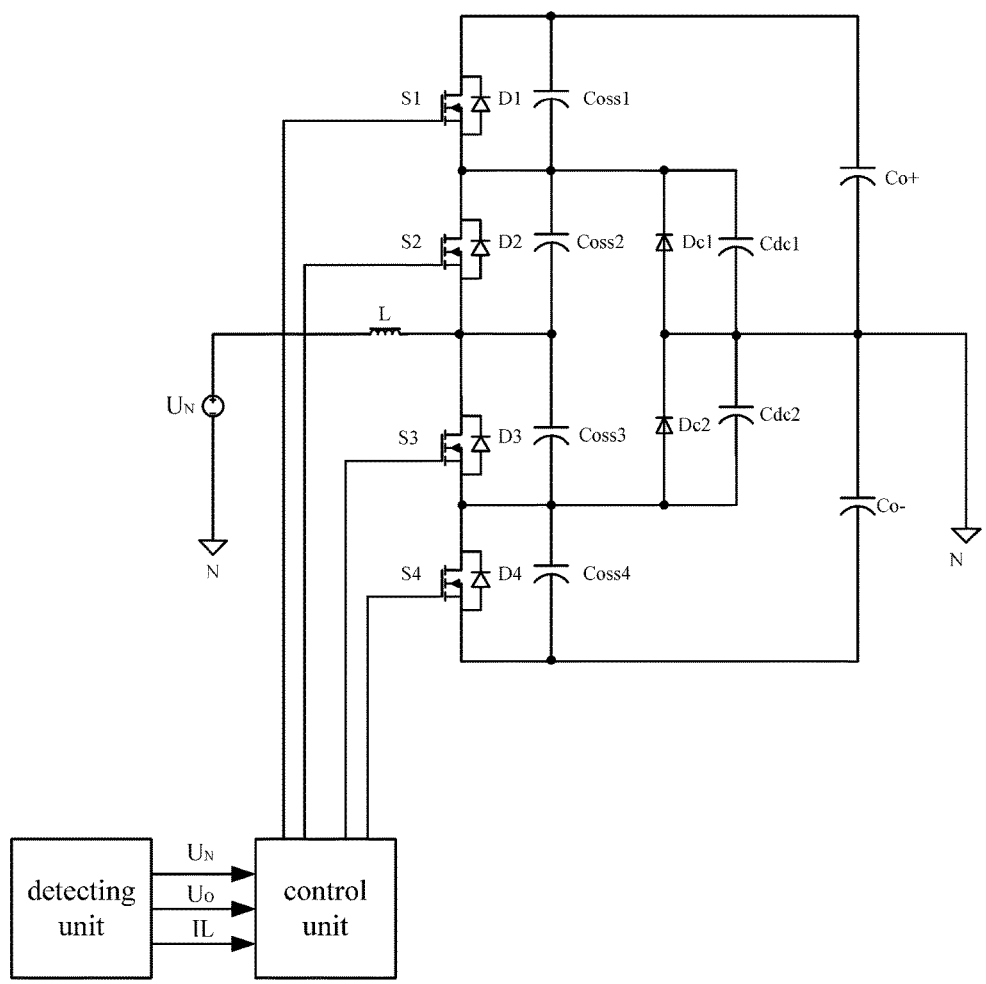
FIG. 20 is a schematic application diagram of a control device for an I-type three-level circuit according to an embodiment of the present disclosure.

The control device according to the embodiments of the present disclosure may be applied in the I-type three-level circuit shown in FIG. 2, as shown in FIG. 20, or may also be applied in the I-type three-level circuits shown in FIG. 7 to FIG. 17, which is not illustrated here.

In an actual implementation, the control unit in FIG. 18 to FIG. 20 can be implemented with a combination operation of a Digital Signal Processing (DSP), a Complex Programmable Logic Device (CPLD)/Field-Programmable Gate Array (FPGA) and a switching tube driving circuit. The CPLD/FPGA may not be required in a case that a control algorithm is simple.

That is, the implementation of the control unit can be determined according to an actual application scenario, which is not limited in the present disclosure.

In conclusion, with the control solution for the I-type three-level circuit according to the embodiments of the present disclosure, in the positive half cycle of the AC connection terminal voltage of the I-type three-level circuit, when the freewheeling switching tube of the high-frequency bridge arm is in ON state and the main switching tube of the high-frequency bridge arm is in OFF state, the freewheeling switching tube and the main switching tube are controlled to keep in the current state till the current of the inductor connected with the high-frequency bridge arm is reversed, the freewheeling switching tube is controlled to be turned off and the main switching tube is controlled to be turned on when the current of the inductor reaches a preset negative current. In the negative half cycle of the AC connection terminal voltage of the I-type three-level circuit, when the freewheeling switching tube of the high-frequency bridge arm is in ON state and the main switching tube of the high-frequency bridge arm is in OFF state, the freewheeling switching tube and the main switching tube are controlled to keep in the current state till the current of the inductor connected with the high-frequency bridge arm is reversed, the freewheeling switching tube is controlled to be turned off and the main switching tube is controlled to be turned on when the current of the inductor reaches a preset positive current. Due to the reversed current, zero-voltage turn on of the switching tube of the high-frequency bridge arm can be realized, thereby reducing the circuit loss and improving the circuit efficiency.

It can be understood by those skilled in the art that the embodiments of the present disclosure can be implemented as a method, a system, or a computer program product. Therefore, the present disclosure can take a form of an entire hardware embodiment, an entire software embodiment or an embodiment including both hardware and software elements. Also, the present disclosure can take a form of a computer program product embodied on one or more computer usable memory medium (including but not limited to a magnet disk memory, CD-ROM, an optical memory and so on) including a computer usable program code.

The present disclosure is described with reference to the flow diagram and/or the block diagram of the method, the device (system) and the computer program product according to the embodiments of the present disclosure. It should be understood that each flow and/or block in the flow diagram and/or the block diagram and a combination of flows and/or blocks of the flow diagram and/or the block diagram can be realized with computer program instructions. The computer program instructions can be provided to a general-purpose computer, a dedicated computer, an embedded processor or a processor of other programmable data processing apparatus, to generate a machine, so that a device for realizing functions specified in one or more flows of the flow diagram and/or one or more blocks in the block diagram can be generated with the instructions executed by the computer or the processor of other programmable data processing apparatus.

The computer program instructions may also be stored in a computer readable memory that can direct the computer or other programmable data processing apparatus to function in a particular manner, such that the instructions stored in the computer readable memory produce an article of manufacture including instruction apparatus which implement the functions specified in one or more flow in the flow diagram and/or one or more blocks in block diagram.

The computer program instructions may also be loaded onto the computer or other programmable data processing apparatus, to cause a series of operational steps to be performed on the computer or other programmable apparatus to produce a computer implemented process, such that the program code which executed on the computer or other programmable apparatus provide steps for implementing the functions specified in one or more flow of the flow diagram and/or one or more blocks of the block diagram.

Although the preferred embodiments of the present disclosure have been described, those skilled in the art can make additional alteration and modifications to the embodiments once knowing a base inventive concept. The appended claims are intended to be explained as including the preferred embodiments and all alterations and modifications falling within the scope of the present disclosure.

Obviously, various changes and variants can be made to the embodiments of the present disclosure by those skilled in the art without departing from the spirit and scope of the embodiments of the present disclosure. In this way, if these changes and variants on the embodiments of the present disclosure fall within the claims of the present disclosure and equivalent technology thereof, the present disclosure is intended to include the changes and variants.

The invention claimed is:

1. A control method for an I-type three-level circuit, characterized in comprising:

detecting a current of an inductor connected with each of high-frequency arm bridges in an operation state in the I-type three-level circuit; and in a positive half cycle of an alternating-current connection terminal voltage of the I-type three-level circuit, when a freewheeling switching tube of the high-frequency arm bridge connected with the inductor is in ON state and a main switching tube of the high-frequency arm bridge connected with the inductor is in OFF state, controlling the freewheeling switching tube in ON state to keep in ON state and the main switching tube in OFF state to keep in OFF state if it is detected that the current of the inductor does not reach a preset negative current, and controlling the freewheeling switching tube in ON state to be turned off and the main switching tube in OFF state to be turned on if it is detected that the current of the inductor reaches the preset negative current, wherein the I-type three-level circuit includes bus capacitors Co+ and Co−, when the alternating-current connection terminal voltage is in the positive half cycle, the bus capacitor Co+ operates while the bus capacitor Co− remains idle, and when the alternating-current connection terminal voltage is in a negative half cycle, the bus capacitor Co− operates while the bus capacitor Co+ remains idle.

2. The control method of claim 1, characterized in that prior to controlling the freewheeling switching tube in ON state to keep in ON state and the main switching tube in OFF state to keep in OFF state, further comprising:

determining that an instantaneous value of the alternating-current connection terminal voltage of the I-type three-level circuit is greater than or equal to a half of a direct-current connection terminal voltage.

3. A control method for an I-type three-level circuit, characterized in comprising:

detecting a current of an inductor connected with each of high-frequency arm bridges in an operation state in the I-type three-level circuit; and in a negative half cycle of an alternating-current connection terminal voltage of the I-type three-level circuit, when a freewheeling switching tube of the high-frequency arm bridge connected with the inductor is in ON state and a main switching tube of the high-frequency arm bridge connected with the inductor is in OFF state, controlling the freewheeling switching tube in ON state to keep in ON state and the main switching tube in OFF state to keep in OFF state if it is detected that the current of the inductor does not reach a preset positive current, and controlling the freewheeling switching tube in ON state to be turned off and the main switching tube in OFF state to be turned on if it is detected that the current of the inductor reaches the preset positive current, wherein the I-type three-level circuit includes bus capacitors Co+ and Co−, when the alternating-current connection terminal voltage is in a positive half cycle, the bus capacitor Co+ operates while the bus capacitor Co− remains idle, and when the alternating-current connection terminal voltage is in the negative half cycle, the bus capacitor Co− operates while the bus capacitor Co+ remains idle.

4. The control method of claim 3, characterized in that prior to controlling the freewheeling switching tube in ON state to keep in ON state and the main switching tube in OFF state to keep in OFF state, further comprising:

determining that an instantaneous value of the alternating-current connection terminal voltage of the I-type three-level circuit is greater than or equal to a half of a direct-current connection terminal voltage.

5. A control device for an I-type three-level circuit, characterized in comprising:

a detecting unit configured to detect a current of an inductor connected with each of high-frequency arm bridges in an operation state in the I-type three-level circuit; and a control unit configured to, in a positive half cycle of an alternating-current connection terminal voltage of the I-type three-level circuit, when a freewheeling switching tube of the high-frequency arm bridge connected with the inductor is in ON state and a main switching tube of the high-frequency arm bridge connected with the inductor is in OFF state, control the freewheeling switching tube in ON state to keep in ON state and the main switching tube in OFF state to keep in OFF state if it is detected that the current of the inductor does not reach a preset negative current, and control the freewheeling switching tube in ON state to be turned off and the main switching tube in OFF state to be turned on if it is detected that the current of the inductor reaches the preset negative current, wherein the I-type three-level circuit includes bus capacitors Co+ and Co−, when the alternating-current connection terminal voltage is in the positive half cycle, the bus capacitor Co+ operates while the bus capacitor Co− remains idle, and when the alternating-current connection terminal voltage is in a negative half cycle, the bus capacitor Co− operates while the bus capacitor Co+ remains idle.

6. The control device of claim 5, characterized in that the control unit is further configured to, prior to controlling the freewheeling switching tube in ON state to keep in ON state and the main switching tube in OFF state to keep in OFF state, determine that an instantaneous value of the alternating-current connection terminal voltage of the I-type three-level circuit is greater than or equal to a half of a direct-current connection terminal voltage.

7. A control device for an I-type three-level circuit, characterized in comprising:

a detecting unit configured to detect a current of an inductor connected with each of high-frequency arm bridges in an operation state in the I-type three-level circuit; and a control unit configured to, in a negative half cycle of an alternating-current connection terminal voltage of the I-type three-level circuit, when a freewheeling switching tube of the high-frequency arm bridge connected with the inductor is in ON state and a main switching tube of the high-frequency arm bridge connected with the inductor is in OFF state, control the freewheeling switching tube in ON state to keep in ON state and the main switching tube in OFF state to keep in OFF state if it is detected that the current of the inductor does not reach a preset positive current, and control the freewheeling switching tube in ON state to be turned off and the main switching tube in OFF state to be turned on if it is detected that the current of the inductor reaches the preset positive current, wherein the I-type three-level circuit includes bus capacitors Co+ and Co−, when the alternating-current connection terminal voltage is in a positive half cycle, the bus capacitor Co+ operates while the bus capacitor Co− remains idle, and when the alternating-current connection terminal voltage is in the negative half cycle, the bus capacitor Co− operates while the bus capacitor Co+ remains idle.

8. The control device of claim 7, characterized in that the control unit is further configured to, prior to controlling the freewheeling switching tube in ON state to keep in ON state and the main switching tube in OFF state to keep in OFF state, determine that an instantaneous value of the alternating-current connection terminal voltage of the I-type three-level circuit is greater than or equal to a half of a direct-current connection terminal voltage.

* * * * *